(12) United States Patent  
Wittenschlaeger

(10) Patent No.: US 7,904,602 B2
(45) Date of Patent: Mar. 8, 2011

(54) DISTRIBUTED COMPUTING BUS

(75) Inventor: Thomas Wittenschlaeger, Irvine, CA (US)

(73) Assignee: Raptor Networks Technology, Inc., Santa Ana, CA (US)

( * ) Notice: Subject to any disclaimer, the term of this patent is extended or adjusted under 35 U.S.C. 154(b) by 0 days.

(21) Appl. No.: 12/122,018

(22) Filed: May 16, 2008

(65) Prior Publication Data

US 2009/0198836 A1    Aug. 6, 2009

Related U.S. Application Data

(60) Provisional application No. 61/038,380, filed on Mar. 20, 2008, provisional application No. 61/032,656, filed on Feb. 29, 2008, provisional application No. 61/026,415, filed on Feb. 5, 2008.

(51) Int. Cl.
*G06F 15/16* (2006.01)
(52) U.S. Cl. ....................................................... 709/253
(58) Field of Classification Search .................. 709/238, 709/253, 242
See application file for complete search history.

(56) References Cited

U.S. PATENT DOCUMENTS

| | | | |
|---|---|---|---|
| 5,361,334 A | 11/1994 | Cawley | |
| 6,105,122 A | 8/2000 | Muller et al. | |
| 6,493,753 B2 | 12/2002 | Ludtke et al. | |
| 6,876,663 B2* | 4/2005 | Johnson et al. | 370/416 |
| 6,970,085 B2* | 11/2005 | Okabe et al. | 340/545.6 |
| 7,061,935 B1* | 6/2006 | Roy et al. | 370/468 |
| 7,111,163 B1* | 9/2006 | Haney | 713/153 |
| 7,263,089 B1* | 8/2007 | Hans et al. | 370/349 |
| 7,499,468 B2* | 3/2009 | Montgomery, Jr. | 370/453 |
| 7,570,579 B2* | 8/2009 | Oran | 370/216 |
| 2003/0005039 A1 | 1/2003 | Craddock et al. | |
| 2003/0117678 A1* | 6/2003 | Chang et al. | 359/157 |
| 2003/0206528 A1* | 11/2003 | Lingafelt et al. | 370/238 |
| 2004/0153707 A1* | 8/2004 | Ellerbrock et al. | 714/4 |
| 2006/0045273 A1* | 3/2006 | Mayer | 380/277 |
| 2007/0076603 A1* | 4/2007 | MeLampy et al. | 370/229 |

* cited by examiner

*Primary Examiner* — Joseph E Avellino
*Assistant Examiner* — Chirag Patel
(74) *Attorney, Agent, or Firm* — Fish & Associates, PC

(57) ABSTRACT

A distributed computing bus that provides both data transport and ambient computing power is provided. Contemplated buses comprise a network fabric of interconnected networking infrastructure nodes capable of being programmed before or after installation in the field. A fabric manager organizes the fabric into a bus topology communicatively coupling computing elements that exchange payload data using a bus protocol. Nodes within the bus topology operate on the payload data as the data passes through the node on route to its destination.

20 Claims, 3 Drawing Sheets

DISTRIBUTED COMPUTING BUS

This application claims the benefit of priority to U.S. provisional application 61/026415 filed Feb. 5, 2008; U.S. provisional application 61/032656 filed Feb. 29, 2008; and U.S. provisional application 61/038380 filed Mar. 20, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is distributed computing technologies.

BACKGROUND

Computing busses are typically localized within a computer and communicatively couple computing elements. The computing busses represent a point-to-point communication path allowing the computing elements to interact with each other via the exchange of data.

Current trends in computing markets are toward distributed computing where computers are linked to each through standard network protocols (e.g., TCP/IP) abstracted from the physical media interconnecting networking nodes. Computers participating within a distributed computing network offer their services (e.g., web services, procedure calls, functions, or other software systems) to each other. However, such distributed computing networks do not offer computing elements access to each other. Additionally, computing networks introduce high latency when data is exchanged rendering them impractical as a computer bus.

Other computing networks do exist that are slightly more suited as a computing bus. InfiniBand® (http://www.infinibandta.org/home) for example, provides high speed fabric connectivity among High Performance Computing (HPC) systems while having moderately low latency. Unfortunately, InfiniBand and other HPC networks are limited to communicating over a distance less than several hundred meters rendering them unsuitable for computing environments spanning across geographically significant distances. Additionally, such networks at best can only connect computer systems or some peripherals, but not all computing elements.

A desirable computing bus would provide bus communications among computing elements over geographically significant distances as well as participate within the computing process.

Computing fabrics can provide a network for distributed computers. Example computing fabrics include Beowulf clusters, PVM developed by the University of Tennessee, Oak Ridge National Laboratory and Emory University, or even U.S. Pat. No. 6,779,016 to Aziz et al. titled "Extensible Computing System" that describes a computing fabric used to create a virtual server farm out of a collection of processors and storage elements. These and other computing fabrics simply provide for distributed computing without offering bus-like communications having high-throughput and low latency among computing elements.

U.S. Pat. No. 5,361,334 to Cawley titled "Data Processing and Communication" describes a data processing system having plurality of processing units and memory units that communicate over a network of routers. Although Cawley provides for connecting computing elements across a network, Cawley does not address the desire for intermediary network nodes participating in the computing process.

U.S. Pat. No. 6,105,122 to Muller et al. titled "I/O Protocol for Highly Configurable Multi-Node Processing System" discusses transferring data from compute nodes to I/O nodes through a fabric of switch nodes. While useful for communicating among edge nodes, the configuration described by Muller still does not address the desire for having network nodes take part in computation.

U.S. patent publication 2003/0005039 to Craddock et al. titled "End Node Partition Using Local Identifiers" discloses a distributed computing system having components including edge nodes, switches, and routers that form a fabric that interconnects the edge nodes. The disclosed fabric employs InfiniBand to form the fabric. However, Craddock also does not address the need for allowing networking nodes to participate in computation.

What has yet to be appreciated is that a distributed networking fabric capable of reconfiguration can provide a viable long haul computing bus accessible by computing elements while maintaining low latency and providing high throughput. Furthermore, a distributed computing bus based on such a network fabric can also take an active role in the computation process. As data is transported across the fabric, the fabric's nodes can operate on payload data according to a desired computational function. Such a fabric can be considered a computational transport fabric.

Thus, there is still a need for a distributed computing bus for connecting computing elements over geographically significant distances.

SUMMARY OF THE INVENTION

The present invention provides apparatus, systems and methods in which a distributed computing bus connects two or more computing elements through a network fabric where the fabric itself provides computing capabilities to the computing elements. The fabric preferrably comprises a plurality of interconnected, programmable nodes where at least two of the nodes are physically separated by geographically significant distances (e.g., greater than five kilometers). Furthermore, such a distributed computing bus also allows the computing elements to be separated by geographically significant distances.

In a preferred embodiment, a fabric manager, possibly a fabric node, configures a bus topology having one or more communication routes through the fabric and having one or more intermediary fabric nodes. As the computing elements exchange data with each other over the communication routes, a node along the route operates on the payload of the data according to one or more computational functions.

In another aspect of the inventive subject matter, the routes through the fabric provide a secured, low-latency, high-throughput communication path between computing elements. Routes can be secured by arranging the links of the routes according to a secret key. In embodiments employing multiple optic fiber links, latency can be less than ten microsecond while having a throughput greater than 30 Gbps.

In yet another aspect of the inventive subject matter, the bus topology can comprise a computational topology for use by the computing elements. The computing elements can program the nodes within the computational topology to perform various computational functions. A preferred computational function includes cipher functions used to encrypt or decrypt data exchanged between the elements.

The term "computing bus" as used herein should be considered to include both a passive and active nature with respect to the operation of a bus. In the passive sense, a computing bus transports data from one computing element to another without substantially interacting with the data. In the active sense, the computing bus takes on a participating role in the computational processing of the data as the data passes through the bus. A fabric providing a distributed computing bus essentially forms a computational transport fabric.

The term "topology" represents a specific configuration of nodes and routes within a network fabric. A topology is considered to remain fixed until the configuration of nodes or routes changes. A topology would not change, for example, if a physical link is changed between two nodes along a route because the route remains intact. A topology would change should the number of nodes change, if a node is replaced, or if the routes among the nodes change.

Various objects, features, aspects and advantages of the inventive subject matter will become more apparent from the following detailed description of preferred embodiments, along with the accompanying drawings in which like numerals represent like components.

DETAILED DESCRIPTION

In the following discussion regarding distributed computing buses, a number of examples are presented showing a limited number of items composing the example scenarios. One skilled in the art will appreciate that the disclosed techniques can be applied to any number of items, larger or smaller, without loss of generality while still falling within the scope of the inventive subject matter.

Figure 1:
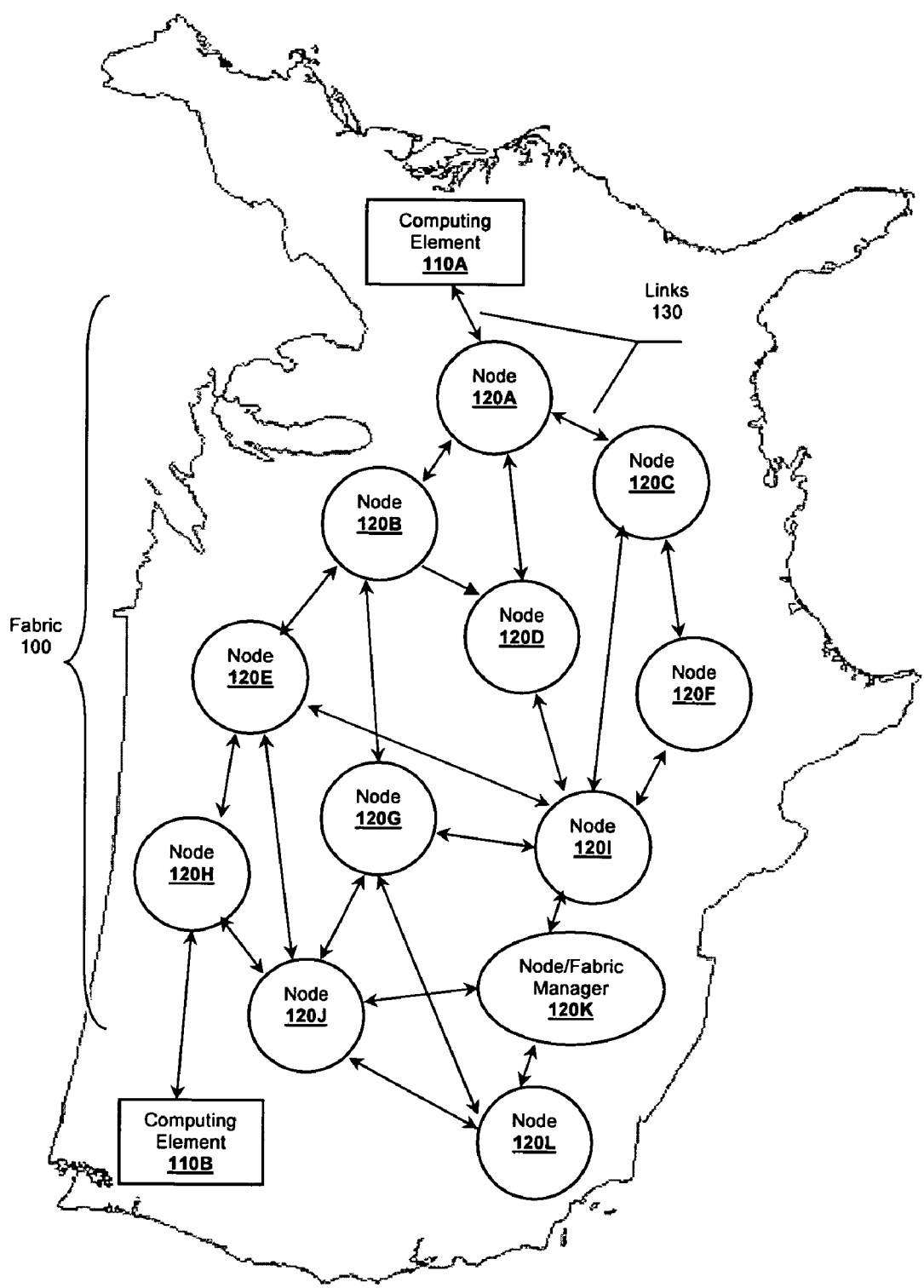
FIG. 1 is a schematic of a network fabric connecting computing elements and whose network nodes are geographically distributed.

In FIG. 1, computing elements 110A and 110B are communicatively coupled through network fabric 100. Computing fabric 100 comprises a network fabric of interconnected, geographically separated programmable nodes 120 that are interconnected through physical communication links 130. In a preferred embodiment, network nodes 120 can be separated over geographically significant distances greater than five kilometers. Furthermore, fabric 100 provides a distributed computing bus between computing elements 110A and 110B even when the computing elements are geographically separated by 5 Km, 10 Km, or greater distances.

Computing elements 110A or 110B can include devices or functional portions of a device. Contemplated devices include computers, servers, set-top boxes appliances, personal data assistant (PDA), cell phones, or other computing devices. Contemplated functional portions of a device include processors, memory, peripherals, displays, or other device components. In some embodiments, device components are adapted via one or more fabric interfaces allowing the component to communication over fabric 100.

Specifically contemplated distributing computing buses include those connecting processing elements with data storage elements and forming a storage area network (SAN). SANs using storage protocols (e.g., iSCSI, ATA over Ethernet, Fibre Channel over IP, Fibre Channel over Ethernet, NFS, or CIFS) are ideal applications for fabric 100. Storage related applications require support for low latency, high throughput communications as provided by fabric 100.

Although fabric 100 is illustrated across the United States, it should be noted that fabric 100 could also comprise a world spanning network, the Internet for example. Alternatively, fabric 100 can be embodiment by a local area network, any packet switched network, an intranet, or even a small office or home network.

Network Nodes

Network nodes 120 comprise networking infrastructure equipment. Example networking equipment includes routers, gateway, switches, hubs, or other devices that provide data transport. In a preferred embodiment, nodes 120 include network switches that provide low-latency, high throughput communications over geographically significant distances.

Nodes 120 preferably comprise a plurality of ingress and egress ports used to route data packets from one node to another. The ports of the node provide physical connections to adjacent nodes. Preferred ports are bi-directional allowing data traffic to flow into and out of the same physical port.

Preferred nodes 120 are field programmable after deployment or installation within fabric 100. A node can be programmed through any suitable method. One acceptable method includes uploading one or more software modules (e.g., programs, scripts, or other instructions) to the node. For example, each node could be deployed with an installed virtual machine. When a computational function is required, a script can be uploaded to the memory of the node to be executed within the virtual machine. Contemplated virtual machines include those that support .Net® by Microsoft®, Java®, Python, Perl, Ruby, or other programmatic environments.

It should be also noted that nodes 120 can pre-programmed with one or more computational functions. Should computing element 110A or 110B wish to activate the computational function, it could simply instruct the node directly or through fabric manager 120K to activate the function. Consider, for example, where nodes 120 include cipher functions to ensure communication routes are secured across fabric 100. Computing element 110A simply instructs nodes along a route to employ the desired cipher functions. As data passes across links between nodes, the nodes encrypt the data according the to selected cipher function, possibly based on a public or private key.

In an especially preferred embodiment, memory is protected to ensure that any secret keys have a reduced risk of being compromised. Preferred memory protecting schemes are based on a standard, for example, Federal Information Processing Standards (FIPS) 140 or its variants.

Preferred nodes 120 comprise memory to store data or software instructions in support of executing a computational function. Contemplated memory includes RAM, Flash, magnetic storage (e.g., a disk drive), race track memory, or other forms of data storage.

Nodes 120 are also contemplated to include a processing element capable of executing more than one processing thread or task substantially at the same time. Preferred processing units comprise multi-core processors including the Intel® Quad Core processor product line. A multi-core processor allows node 120 to execute a desire computational function without substantially interfering with execution of packet routing duties. One should appreciate that any processor having sufficient compute power would be equally suitable for deployment in nodes 120. Other contemplated processors include those developed by MIPS, AMD, Sparc, ARM, Freescale, Transmeta, or other vendors or designers.

One should note that given the processing power and memory available to nodes 120, nodes 120 can also operate as computing elements 110A or 110B. For example, node 120J can dispatch one or more processes to be executed on processors or cores on other nodes. Additionally, node 120J can access shared memory from other nodes. In such a configuration, computing elements 110A or 110B comprise nodes from fabric 100.

Links

Adjacent nodes 120 connect to each other through one or more physical communication links 130. Links 130 can be wired or wireless. Preferred links included those that ensure data is transmitted with high throughput and low latency. Especially preferred links include optic fiber links capable of transporting data over geographically significant distances. For example, a single mode optic fiber can support transmission of data up to 40 Km at a wavelength of 1550 nanometers (nm) with a throughput of 10 Gbps. An additional example of a fiber optic link includes those under development by the IEEE 802.3 Higher Speed Study Group. The contemplated fibers support bandwidths from 40 Gbps to 100 Gbps over distances up to 40 Km using a single mode optical fiber.

In some embodiments, adjacent pairs of nodes 120 can be interconnected through more than one of link 130. In such scenarios, links 130 can be aggregated to form a high throughput data path for data exchange between adjacent nodes. Links can be aggregated through IEEE 802.ab link aggregation or other suitable methods. High throughput (e.g., greater than 30 Gbps) can be achieved by aggregating three or more 10 Gbps optic fibers carrying Ethernet traffic.

Manager

In a preferred embodiment, network nodes 120 are fungible with respect to one or more fabric management functions. Contemplated fabric management functions include storing route tables, disseminating routing information, assigning paths, monitoring fabric metrics and health, alerting, logging events, providing recovery for failures, reporting, or enforcing security. Although fabric manager 120K is preferably one of nodes 120, it is also contemplated that a fabric manager can be external to fabric 100 or could include one of computing element 110A or 110B.

Preferably manager 120K has responsibility for configuration of routing through fabric 100. Fabric manager 120K maintains the coherency of fabric 100 by assigning paths from an ingress port of a first node 120 to an egress port of a second node 120. The routing table information can be disseminated to all other nodes 120 to ensure the fabric is substantially synchronized. Should manager 120K fail, another node 120 can begin operating as the fabric manager because it has all necessary routing information. Furthermore, such a fabric operates as a distributed core fabric where the entire fabric functions as a single, coherent device; for example a network switch. By providing sufficient routing information to all of nodes 120, data can be transported from computing element 110A to 110B with extremely low latency (e.g., less than 10 microseconds).

Raptor Network Technology, Inc. (http://www.raptor-networks.com) of Santa Ana, Calif., produces network switches that include the contemplated management functions and can be deployed to form a distributed core fabric. The Raptor ER-1010 switch offers several advantages including providing communication with latency less than 10 microseconds, throughput greater than 30 Gbps through link aggregation of optic fiber links, as well as communication over geographically significant distances. Raptor's switch technology is more fully described in U.S. Pat. No. 7,352,745 and in U.S. patent applications having Ser. Nos. 10/965,444, 11/248,710, 11/248,711, 11/248,708, 11/248,111, 11/248,639, and 11/248,707.

It is also contemplated that other network equipment vendors could also adapt their products to offer the capabilities disclosed within this document. Other vendors of networking equipment include Juniper® Networks (http://www.juniper.net) of Sunnyvale, Calif., or Cisco Systems, Inc. (http://www.cisco.com), of San Jose, Calif. One should note that the concept of adapting legacy products to employ the disclosed capabilities also falls within the scope of the inventive subject matter.

Bus Topology

Figure 2:
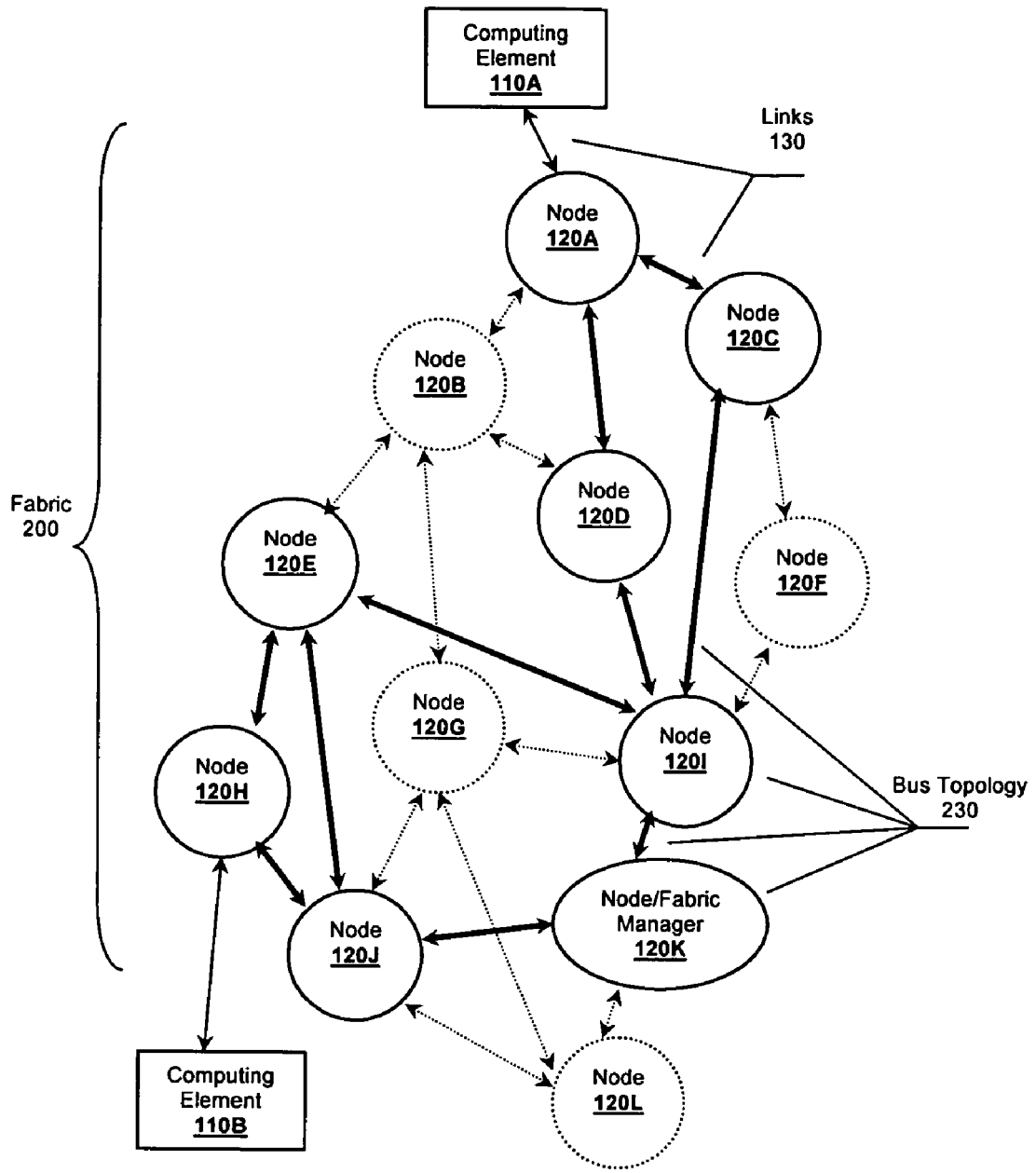
FIG. 2 is a schematic of the fabric from FIG. 1 having a distributed computing bus topology.

In FIG. 2, fabric 200 comprises bus topology 230. Fabric manager 120K has configured bus topology 230 to have a specific configuration of nodes 120 and links 130 interconnecting the nodes. Bus topology 230 is represented by solid lines while other nodes and links external to bus topology 230 are represent by dotted lines. One should note that although various nodes 120 (e.g., node 120B, 120F, 120G, and 120L) are external to bus topology 230, they are still operating members of fabric 200 providing transport of data across the fabric. Additionally, fabric manager 120K is shown as a member of bus topology 230. However, it should be appreciated that fabric manager 120K can also be external to bus topology 230 while retaining its management roles or responsibilities.

Fabric manager 120K is adapted or otherwise programmed to configure a bus topology among nodes 120 where the bus topology provides a communication route through fabric 100 allowing computing elements 110A and 110B to interact via exchange of payload data. Preferably fabric manager 120K configures bus topology 230 to have a plurality of routes through fabric 200 from computing element 110A to computing element 110B. In the example provided, bus topology 230 comprises nodes 120A, C, D, E, H, I J, and K and links 130 interconnecting them. Data packets sent from computing element 110A could travel a long a route defined by nodes 120 "ACIEJH", or alternatively along a route defined by nodes 120 "ADIKJEH" where the routes differ from each other by at least one of physical links 130. In a preferred embodiment, the routes are configured to transport data between computing elements 110A and 110B with latency less than 10 microseconds or a throughput greater than 30 Gbps.

Contemplated topologies include regular topologies or irregular topologies. A regular topology represents a topology where nodes and routes are arranged according to a specified, predictable pattern. For example, an N-dimensional cube arrangement is considered a regular topology. An irregular topology lacks a defined structure. Example, irregular topologies include peer-to-peer or mesh arrangements.

Creating multiple routes within bus topology 230 provides numerous advantages. One advantage includes providing fault tolerance in communications between element 110A and 110B. Should a route fail due to a lost node or failed link, packets can be rerouted through other paths. In a distributed core fabric, such rerouting of data packets across bus topology 230 occurs in a substantially transparent fashion with respect to the computing elements. An additional advantage of multiple routes includes increased throughput across bus topology 230. Payload data from element 110A can be divided into data chunks by node 120A and sent through differ routes selected from the multiple routes to element 110B. Sending data chunks across multiple routes within bus topology 230 increases the parallelism of the data transport effectively increasing throughput from node 120A to node 120H. Additionally, sending data chunks across multiple routes increases security of the payload data transmission by spreading the chunks across geographically distributed paths in a manner where it becomes impractical for a threat to monitor all links to reconstruct the payload data.

In some embodiments, fragmentation and reassembly operates in a similar fashion as employed in IPv4 and defined in Internet Engineering Task Force (IETF) RFC 791 or RFC 815 with the difference that nodes 120 have an understanding of payload data and take a larger role within the fragmentation and reassembly process. However, any fragmentation or reassembly computational function or other algorithm can be employed including those that are known or yet to be created.

In an especially preferred embodiment, the routes within bus topology are secured through a secret key. Preferably routes are secured by rotating routes within bus topology 230. For example, fabric manager 120K can execute a computational function using a secret key as a seed for a pseudo random number generator to establish new routes in near real-time. Fabric manager 120K disseminates the new routing information to all of nodes 120 or just the nodes within topology 230.

It is also contemplated that data communications along the routes can be secured through the use of cipher functions operating as computational functions on nodes 120. For example, after a suitable key exchange, data can be secured by node 120A encrypting data sent from computing element 110A and decrypted by node 120H before presentation to computing element 110B. Additionally, each pair of nodes can independently secure a data exchange when transmitting data across links 130. Contemplated cipher functions include AES, DES, 3DES, RC4, or other cryptographic functions known or yet to be invented. Additionally, cipher functions can employ one or more security protocols for confidentiality, integrity, or authentication. Example security protocols include HTTPS, SSL, SSH, RADIUS, Kerberos, or OpenID One skilled in the art should appreciate that fabric 200 can comprises more than one fabric manager or more than one bus topology to support a plurality of computing elements. Fabric manager 120K can support management of multiple bus topologies to the limits of its hardware or software capabilities. Furthermore, because nodes 120 are fungible with respect the fabric management functions, any of nodes 120 can also become a fabric manager to manage a bus topology different from bus topology 230.

Although fabric manger 120K manages bus topology 230, it is also contemplated that each pair of nodes 120, node 120D and 120I for example, can locally optimize data exchange over their connecting link 130. For example, as data bandwidth is consumed due to general network data transport across a link, node 120D and 120I can negotiate the use of a different data channel, possibly an unused wavelength of light on an optic fiber link, for computational data. One skilled in the art will appreciate that bus topology 230 can be globally optimized through fabric manager 120K as well as locally optimized by adjacent nodes.

Bus Protocol

In a preferred embodiment, nodes 120 are configured to allow computing elements 110A and 110B to communicate with each other using one or more bus protocols. A bus protocol represents a convention by which two computing elements communicate through the exchange of data where data can include commands or information.

Preferred bus protocols utilize one or more layers of an OSI communication stack to transport data from one element to another. Contemplated bus protocols include those that employ most of the features of an OSI stack (e.g., TCP/IP) or those that bypass levels of the communication stack (e.g., raw socket interface). In a preferred embodiment, a bus protocol comprises an Ethernet component to transport payload data from computing element 110A to computing element 110B.

In some embodiments, low level or native bus protocols can be converted for transport across bus topology 230. Example converted protocols includes native bus protocols tunneled through TCP/IP or UDP/IP. For example, it is contemplated that native protocols including SAS, SATA, PATA, PCI, PCI-Express, USB, HyperTransport®, or Quick Path Interconnect® developed by Intel can be tunneled from computing element 110A to element 110B. It is also contemplated that computing elements employing native buses can be adapted with tunneling modules for transporting payload data across bus topology 230 or fabric 200.

In other embodiments, high level bus protocols are designed for use across a network utilizing multiple layers of an OSI communication stack. Example high level bus protocols include iSCSI, RDMA, Internet Wide Area RDMA Protocol (iWARP) developed by the IETF, System Packet Interface, Message Passing Interface, or other bus protocols designed to interface with an OSI communication stack.

Payload Data

As used herein "payload data" represents application level data exchanged between computing elements 110A and 110B. Payload data can comprise data or commands. Commands can include programmatic code associated with a computational function or even encoded protocol commands. Although the concepts presented herein can be applied to standardized protocol headers, payload data preferably resides within the payload section of a protocol packet. For example, an Ethernet frame typically comprises 14 bytes of headers and 4 bytes of a 32-bit checksum, while the payload section of Ethernet can carry up to 1500 bytes of payload data. One skilled in the art will recognize that Ethernet, in some cases, can employ jumbo or super jumbo frames supporting more than 1500 bytes as payload data. Additionally, one will recognize that a datagram sent via IP can support up to 64 KB of data within a payload although the datagram's payload is distributed across multiple packets.

Preferred payload data comprises application data transmitted at the transport layer or below. For example, iSCSI protocol data sent via TCP/IP and encapsulated by TCP would be considered payload data. However, the TCP, IP, and Ethernet headers would not be considered payload data. Contemplated viable transport layers include TCP, UDP, DCCP, SDP, SCTP, RSVP, ECN, RTMP, or other OSI level 4 protocols. It is also contemplated that payload data could be transmitted via lower level protocols based simply on IPv4, IPv6, or even Ethernet. By allowing nodes to be aware of and to access payload data, the nodes are able to fully participate in the computation process.

Bus Topology Reconfiguration

Figure 3:
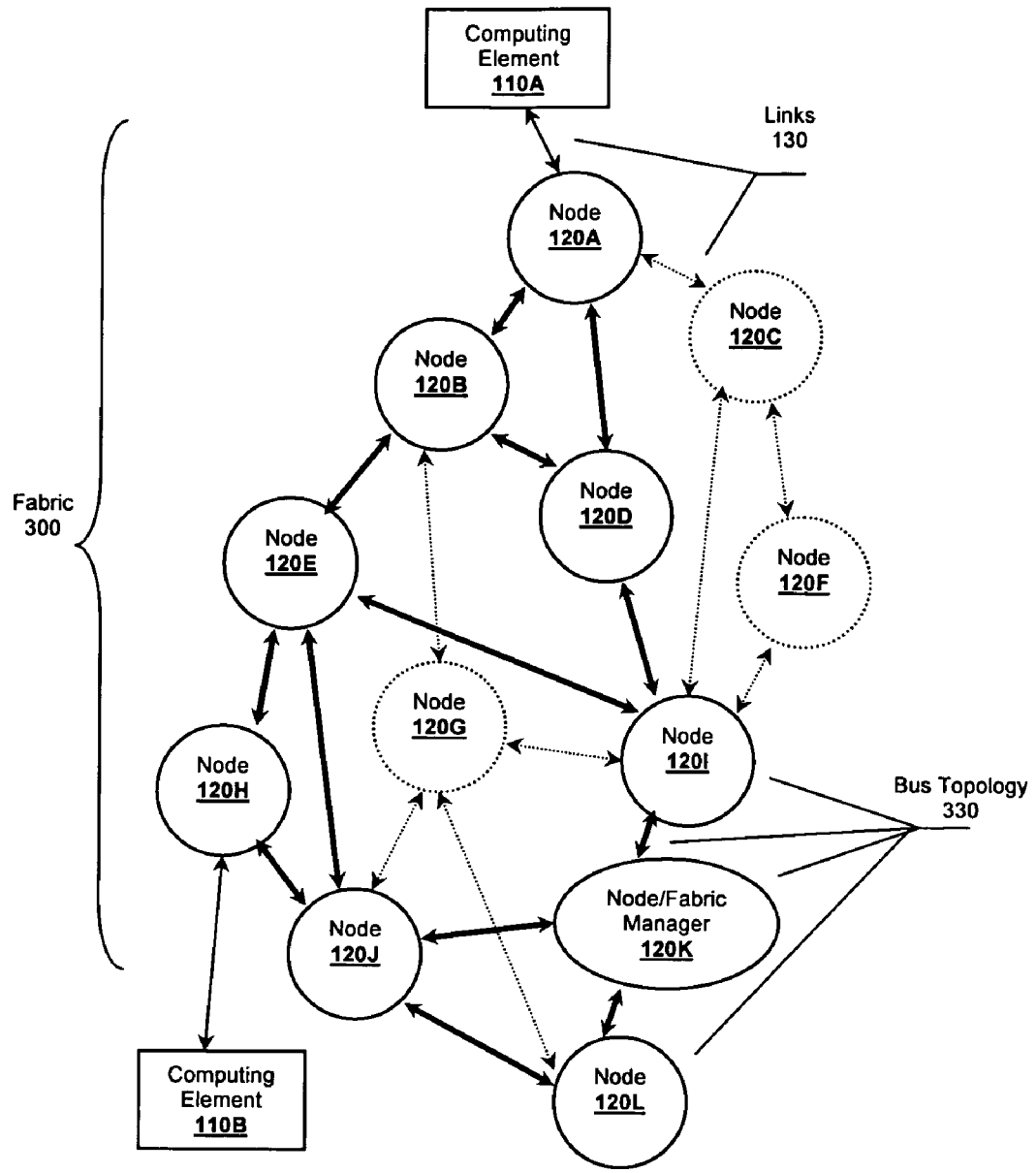
FIG. 3 is a schematic of the fabric from FIG. 2 having a reconfigured computing bus topology.

In FIG. 3, fabric 300 illustrates an example of a reconfigured bus topology 330 that differs from bus topology 230 in FIG. 2. Note that bus topology lacks nodes 120C while adding nodes 120B and 120L along with associated links 130.

Fabric manager 120K is adapted or otherwise programmed to reconfigure bus topology 330 while computing elements 110A and 110B retain connectivity. In a preferred embodiment, fabric manger 120K reconfigured bus topology 230 as necessary due to a triggering event. Preferred triggering events include those based on time or a condition. A time based trigger includes periodically, either regularly or irregularly, changing the topology according to a computational function, preferably based on a secret key as discussed previously. A condition based trigger includes events based on one or more fabric metrics. When a metric reaches a defined threshold or value, fabric manager 120K initiates a reconfiguration. For example, should fabric manager 120K recognize the failure of node 120E due to lack of a heartbeat, manager 120K can reconfigure the bus topology to retain connectivity between computing element 110A and 110B even though altering the number of nodes with the bus topology.

Computing elements 110A and 110B preferably retain connectivity through reconfiguration of the intermediary bus topology. Retaining connectivity during a reconfiguration implies that payload data exchanged between computing element 110A and 110B experiences a delay of no more than one second as measured from the ingress port to the egress port across of fabric 300. In embodiments based on Raptor switch technology, a fabric topology can be reconfigured nearly instantaneously (e.g., less than 100 microseconds) due to all switches having current, synchronized routing information. Computing elements 110A or 110B would lack awareness of the reconfiguration event. Such reconfiguration capabilities can be achieved because fabric 300 largely operates independently from the computing elements, unless instructed otherwise by an administrator or by a computing element.

In an especially preferred embodiment, bus topology 330 can be reconfigured in a time frame faster than the latency experienced by elements 110A or 110B during data exchange, general data transport or computational data transport. For example, a Raptor distributed core fabric can establish new routes in less than ten microseconds, which is faster than an average latency incurred by the fabric for general data transport.

Computing Topology

Bus topology 330 preferably comprises a computing topology. A computing topology represents a set of interconnected nodes 120 within a bus topology where at least one of the nodes along a route is programmed to operate on payload data according to a computation function as the payload passes through the node.

It should be noted that two or more computing topologies can co-exist within bus topology 330 for use by computing elements 110A or 110B. For example, computing element 110A can aggregate nodes 120A, B, and D into a computing topology where each node executes a computational function to query a database programmed by computing element 110A. The results of the queries can then be forward to computing element 110B. Additionally, computing element 110B could configure nodes 120E, H, and J into a computing topology and programmed by element 110B that analyzes results sent by computing elements 110A via its computing topology. One skilled it the art will recognize that the nodes are further configured to be programmed with the computational function.

It is also contemplated that a computing topology in conjunction with nodes 120 having computational functions forms a loop within bus topology 230. Loops can be advantageously employed for programmatic constructs requiring repetitive instructions. Additionally, loops can be created within a computing topology where data sent by a computing element traverses nodes within a loop and returns back to the source computing element. In this sense, the computing elements are both a source and a destination element. For example, a multi-stage database filtering function could be distributed to various nodes, where each node represents a stage of the filter. As a node requests and filters database records, reports can be sent back to the computing element while records passing the filter are forwarded to the next stage, and so on. Eventually the completely filtered records are returned back to the computing element.

Should a computing topology require modification, possibly due to a threat or excessive traffic load in fabric 300, fabric manager 120K is able to reconfigure the computing topology while preferentially retaining specific nodes within the computing topology. In such a reconfiguration, the routes within the computing topology change; however, the nodes executing computational functions do not.

As previously discussed computational functions include programmatic instructions that can be programmed in the field or pre-programmed. Preferred computational functions comprise a cipher function, including cryptographic functions. Providing cipher functions within fabric 300 allows fabric 300 to transport data from computing element 110A to computing element 110B without incurring processing overhead on the computing elements while leveraging the ambient computing power of the networking infrastructure.

In a preferred embodiment, at least one of node 120 along a route from computing element 110A or 110B within bus topology 330 is programmed to operate on payload data according to a computational function as the payload data passes through the node. As payload data passes through the node 120, depending on the nature of the computational function, the data could be immediately forwarded on its way before, during, or after the application of the function, or the payload data could be stored or copied to be combined with other payload data previously stored or yet to arrive.

The disclosed inventive subject matter can be considered a computation transport fabric providing both transport and computing capabilities. One should note that computing elements are able to leverage ambient computing power of the fabric by aggregating the functionality to form virtual computers.

Although the disclosed techniques can be advantageously applied to the secure transport of data across a fabric, the techniques can also be applied with equal or greater alacrity to broader markets. Contemplated markets include database processing as discussed above, distributed gaming systems where switches or routes operate under the control of game servers to reduce lag times, computer graphic rendering engines utilizing switches or routers to process data, scientific research or simulations similar to SET@Home or protein folding, storage networks using network nodes to mirror or synchronize data sets, HPC applications, low level processor or memory accesses, or other applications that would benefit from ambient computing power provided by a distributed computing bus. Furthermore, computing elements, regardless of the application or market, can take advantage of the disclosed distributed computing bus by levering its high throughput, low latency communications.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A distributed computing bus that connects two computing elements, the bus comprising:

a network fabric of interconnected, geographically separated field programmable nodes;

a fabric manager adapted to configure a bus topology among the nodes where the bus topology provides a communication route through the fabric allowing the two computing elements to interact via exchanging a packet having payload data in a payload section of the packet, where the packet is exchanged according to a protocol at or below a transport layer;

wherein at least one of the computing elements is a device component, which is at least one of a processor, a memory, and a display;

wherein at least one of the nodes that is an intermediary node between the computing elements along the route is field programmed to operate on the payload data in the payload section of the packet according to a computational function of a computing topology as the packet is routed through the intermediary node according to a header of the packet; and wherein the fabric manager is further adapted to reconfigure the bus topology within an average latency of data transport across the fabric between the computing elements while the two computing elements retain connectivity via the protocol, and while retaining execution of the computational function through a reconfiguration of the bus topology by reconfiguring routes of the computation topology while retaining specific nodes executing the computational function within the computation topology.

2. The bus of claim 1, wherein the two computing elements are geographically separated.

3. The bus of claim 2, wherein the two computing elements are separated by at least 10 Km.

4. The bus of claim 1, wherein the nodes are configured to allow the two computing elements to communicate using a native bus protocol of at least one of the computing elements transported by the protocol.

5. The bus of claim 4, wherein the bus protocol comprises an Ethernet component.

6. The bus of claim 1, wherein the communication route is configured to transport data between the two computing elements with a latency of less than ten microseconds.

7. The bus of claim 1, wherein the communication route is configured to transport data between the two computing elements with a throughput of at least 30 Gbps.

8. The bus of claim 1, wherein the bus topology comprises a plurality of routes through the fabric.

9. The bus of claim 8, wherein at least one of the nodes is configured to divide the payload data exchanged between the two computing elements into data chunks and to send the chunks through different routes selected from the plurality of routes.

10. The bus of claim 8, wherein the plurality of routes are different from each other by at least one physical communication link.

11. The bus of claim 8, wherein the topology of the plurality of routes is secured by arranging links of the routes according to a secret key.

12. The bus of claim 1, wherein the computation function comprises a cipher function.

13. The bus of claim 1, wherein the nodes are further configured to be programmed with the computational function by storing software instructions corresponding to the function in a memory of the nodes.

14. The bus of claim 13, wherein the intermediary node is configured to receive the software instructions from at least one of the two computing elements, and to store the software instructions in its memory.

15. The bus of claim 13, wherein the computing topology is used by at least one of the computing elements.

16. The bus of claim 1, wherein at least one of the nodes comprises the fabric manager.

17. The bus of claim 1, wherein the fabric comprises a distributed core fabric.

18. The bus of claim 16, wherein the plurality of nodes comprises switches.

19. The bus of claim 1, wherein the two computing elements comprise nodes from the plurality of nodes.

20. The bus of claim 1, wherein the fabric manager is adapted to alter a number of nodes within the bus topology while the two computing elements retain connectivity.

* * * * *